US010743683B2

(12) United States Patent
Deng et al.

(10) Patent No.: US 10,743,683 B2
(45) Date of Patent: Aug. 18, 2020

(54) APPARATUS AND METHOD FOR DETECTING STOCK-OUT OF ARTICLES ON RACK AND RACK

(71) Applicant: BOE TECHNOLOGY GROUP CO., LTD., Beijing (CN)

(72) Inventors: Wei Deng, Beijing (CN); Shijie Cao, Beijing (CN); Hongyan Pei, Beijing (CN); Huawei Yu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 76 days.

(21) Appl. No.: 16/136,177

(22) Filed: Sep. 19, 2018

(65) Prior Publication Data
US 2019/0282001 A1 Sep. 19, 2019

(30) Foreign Application Priority Data
Mar. 16, 2018 (CN) .......................... 2018 1 0219456

(51) Int. Cl.
G06Q 30/00 (2012.01)
A47F 10/02 (2006.01)
A47F 5/00 (2006.01)
G01C 3/12 (2006.01)

(52) U.S. Cl.
CPC ............ *A47F 10/02* (2013.01); *A47F 5/0018* (2013.01); *G01C 3/12* (2013.01); *A47F 2010/025* (2013.01)

(58) Field of Classification Search
CPC .. A47F 10/02; A47F 2010/025; A47F 5/0018; G01C 3/12
See application file for complete search history.

(56) References Cited

U.S. PATENT DOCUMENTS

| 2006/0164247 | A1* | 7/2006 | Overhultz | A47F 10/02 340/572.1 |
| 2014/0017043 | A1* | 1/2014 | Hirai | A01G 31/02 414/267 |
| 2015/0262116 | A1* | 9/2015 | Katircioglu | G06Q 10/087 705/28 |
| 2018/0165626 | A1* | 6/2018 | Davidson | G06Q 10/08 |
| 2018/0374127 | A1* | 12/2018 | Walden | H04W 4/35 |
| 2019/0272498 | A1 | 9/2019 | Swafford | |
| 2019/0279149 | A1 | 9/2019 | Swafford et al. | |
| 2019/0282001 | A1* | 9/2019 | Deng | G01C 3/12 |

(Continued)

FOREIGN PATENT DOCUMENTS

| CN | 102106655 A | 6/2011 |
| CN | 105314315 A | 2/2016 |

(Continued)

OTHER PUBLICATIONS

First Chinese Office Action dated Jan. 17, 2020, received for corresponding Chinese Application No. 201810219456.5, 16 pages.

*Primary Examiner* — Thien M Le
(74) *Attorney, Agent, or Firm* — Kinney & Lange, P.A.

(57) ABSTRACT

The present application proposes an apparatus and method for detecting stock-out of articles on a rack and a rack. The apparatus includes: a distance detector configured to detect a distance between the article farthest from a first end and one of the first end and a second end; and a controlling and processing unit communicatively connected to the distance detector and configured to determine whether the articles are out of stock based on the distance.

17 Claims, 7 Drawing Sheets

(56) References Cited

U.S. PATENT DOCUMENTS

2019/0339923 A1* 11/2019 Nel ..................... G06Q 10/087
2020/0005225 A1* 1/2020 Chaubard ............ H04N 5/2253

FOREIGN PATENT DOCUMENTS

| CN | 205982180 U | 2/2017 |
| CN | 107016786 A | 8/2017 |
| CN | 107105905 A | 8/2017 |
| CN | 107301730 A | 10/2017 |

* cited by examiner

100

APPARATUS AND METHOD FOR DETECTING STOCK-OUT OF ARTICLES ON RACK AND RACK

CROSS-REFERENCE TO RELATED APPLICATION(S)

This application claims priority from Chinese Patent Application No. 201810219456.5 filed on Mar. 16, 2018, the entire contents of which are hereby incorporated by reference.

TECHNICAL FIELD

The present disclosure relates to the field of intelligent solutions for vending, and more particularly, to an apparatus and method for detecting stock-out of articles on a rack and a rack.

BACKGROUND

With the development of technologies such as artificial intelligence, the "new retail mode" has increasingly attracted people's attention. In traditional retailing, there is generally a patrolman who counts and arranges articles on racks and replenishes them when necessary, which requires a great amount of labor costs. In the "new retail mode", an automatic vending system based on automatic stock-out detecting, automatic reminding and automatic replenishing will significantly reduce associated labor costs. However, related automatic vending systems are not yet able to meet the needs of the development of the "new retail mode".

SUMMARY

According to an aspect of the present disclosure, there is proposed an apparatus for detecting stock-out of articles on a rack, the rack comprising a first end and a second end opposite to each other and being capable of accommodating the articles arranged from the first end towards the second end, the apparatus comprising:

a distance detector, configured to detect a distance between an article farthest from the first end and one of the first end and the second end; and a controlling and processing unit, communicatively connected to the distance detector and configured to determine whether the articles are out of stock based on the distance.

In some embodiments, the distance detector comprises: a distance detection sensor, capable of being mounted at the second end of the rack and transmitting a probe wave to the articles at the second end and receiving a reflected wave of the probe wave. The controlling and processing unit is further configured to calculate a distance between the article farthest from the first end and the second end based on a time difference between a transmitting time of the probe wave and a receiving time of the reflected wave.

In some embodiments, the probe wave is an ultrasonic wave or an infrared ray.

In some embodiments, the controlling and processing unit is configured to compare the distance with a first distance threshold, and to determine that the articles are out of stock if the distance is greater than the first distance threshold.

In some embodiments, the controlling and processing unit is configured to:

determine a number of remaining articles based on the distance, a distance from the first end to the second end, and a thickness of a single article in the arrangement direction;

compare the number of the remaining articles to a number threshold; and determine that the articles are out of stock if the number of the remaining articles is less than the number threshold.

In some embodiments, the controlling and processing unit is further configured to:

determine whether the distance has increased, and determine whether the articles are out of stock, on the condition that the distance has increased.

In some embodiments, the distance detector comprises:

an elastic tape having a fixing end fixed to the first end and a winding end being retractable such that the elastic tape may extend and retract in the direction from the first end to the second end, wherein the material of the elastic tape comprises resistive material;

a housing, configured to accommodate the winding end of the elastic tape and being capable of moving with the winding end as the elastic tape extends and retracts, wherein the housing has an opening through which the elastic tape passes to be wound up in the housing;

two electrode sheets, one of which being configured to be electrically connected to the fixing end of the elastic tape and the other being configured to be electrically connected to a portion of the elastic tape at the opening of the housing, the two electrode sheets being configured to measure resistance between the fixing end of the elastic tape and the portion of the elastic tape at the opening of the housing.

The controlling and processing unit is further configured to calculate the distance between the article farthest from the first end and the first end based on the resistance.

In some embodiments, the controlling and processing unit is configured to compare the distance with a second distance threshold, and determine that the articles are out of stock if the distance is less than the second distance threshold.

In some embodiments, the controlling and processing unit is configured to:

determine a number of remaining articles based on the distance and a thickness of a single article in the arrangement direction;

compare the number of the remaining articles to a number threshold; and determine that the articles are out of stock if the number of the remaining articles is less than the number threshold.

In some embodiments, the controlling and processing unit is further configured to:

determine whether the distance has decreased, and determine whether the articles are out of stock on the condition that the distance has decreased.

In some embodiments, the apparatus further comprises a presenting unit communicatively connected to the controlling and processing unit. The presenting unit is configured to present information about the inventory status of the articles.

In some embodiments, the information about the inventory status of the articles comprises at least one of the number of the remaining articles, a status indicating whether or not the articles are out of stock, and stock-out warning information.

According to another aspect of the present disclosure, there is proposed a method for detecting stock-out of articles on a rack, the rack comprising a first end and a second end opposite to each other and being capable of accommodating the articles arranged from the first end towards the second end, the method comprising steps of:

detecting a distance between an article farthest from the first end and one of the first end and the second end; and determining whether the articles are out of stock based on the distance.

In some embodiments, the method further comprises:
comparing the distance to a distance threshold, and
determining whether the articles are out of stock based on the comparison result.

In some embodiments, the method further comprises:
determining the number of the remaining articles based on the distance and at least one of a distance from the first end to the second end or a thickness of a single article in the arrangement direction;
comparing the number of the remaining articles to a number threshold; and
determining that the articles are out of stock if the number of the remaining articles is less than the number threshold.

In some embodiments, the method further comprises:
determining whether the distance has changed;
determining whether the articles are out of stock on the condition that the distance has changed.

In some embodiments, the method further comprises:
presenting stock-out warning information if it is determined that the articles are out of stock.

In still another aspect of the present disclosure, there is also proposed a rack comprising the apparatus according to any previous embodiment.

DETAILED DESCRIPTION

A stereoscopic displaying solution provided by specific embodiments of the present disclosure will be further described in detail below in conjunction with the accompanying drawings, so that those skilled in the art can better understand the solution of the present disclosure. It is apparent that the described and illustrated embodiments and the various specific features thereof are merely illustrative of the present disclosure and are not intended to limit the disclosure. All the other embodiments and specific features thereof obtained by those of ordinary skill in the art based on the exemplary description without creative efforts shall fall within the protection scope of the disclosure.

It should be understood that terms "stock-out", "out of stock" and the like mean that a number of corresponding articles on a rack has decreased below a specific level (e.g. less than a specific threshold number), rather than exactly being equal to zero. Therefore, when in a "stock-out" status, there still may be several articles left on the rack.

Figure 1:
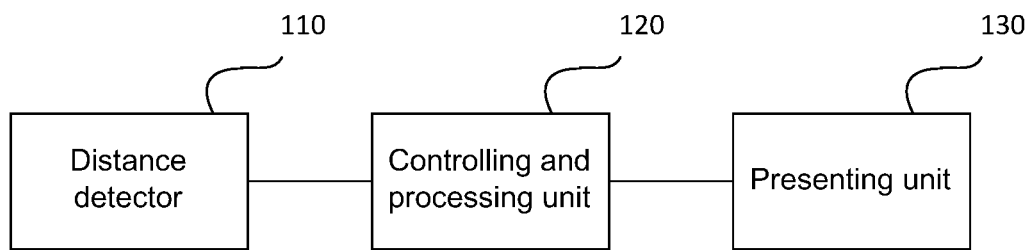
FIG. 1 illustrates an apparatus for detecting stock-out of articles on a rack according to an embodiment of the present disclosure.

Now refer to FIG. 1, which illustrates an apparatus for detecting stock-out of articles on a rack according to an embodiment of the present disclosure.

The rack that can be used to implement embodiments of the present disclosure can comprise a first end and a second end opposite to each other, and it can accommodate articles arranged from the first end towards the second end. Since the same kind of articles are usually arranged in groups on the rack (such as racks in supermarkets, warehouses, etc.), and the articles are usually removed from a same end (usually the outer end of the rack, that is, the end facing the user), the first end may correspond to the inner end (i.e., the end facing away from the user), and the second end may correspond to the outer end in these embodiments. As such, the articles on the rack are always kept arranged starting from the first end as the articles are removed from the rack.

In further embodiments, the rack may comprise a mechanism that automatically pushes a group of articles towards the outer end of the rack. In these embodiments, the first end may correspond to the outer end and the second end may correspond to the inner end. As such, the articles on the rack are also always kept arranged starting from the first end as the articles are removed from the rack.

As illustrated in FIG. 1, the apparatus 100 comprises a distance detector 110, a controlling and processing unit 120, and a presenting unit 130. It should be understood that, in some embodiments, the presenting unit 130 may be omitted.

The distance detector 110 can be mounted or otherwise disposed on the rack. The distance detector 110 is configured to detect a distance between an end of a group of articles arranged on the rack and the first or second end of the rack. In some embodiments, the distance detector 110 can be configured to detect a distance between an article farthest from the first end and the first end. In some embodiments, the distance detector 110 can be configured to detect a distance between the article farthest from the first end and the second end.

The controlling and processing unit 120 is communicatively connected to the distance detector 110 and is configured to determine whether the articles are out of stock based on the distance.

The distance detector 110 can be any apparatus known in the art that may be adapted to detect a distance between the end of a group of articles arranged on the rack and the first or second end of the rack, for example, a ultrasonic distance detection sensor, an infrared distance detection sensor, a distance detector based on resistance measurement described below, etc. The number of removed articles and the number of remaining articles can be determined by detecting the distance between the end of remaining articles and the end of the rack.

As mentioned above, a group of articles are usually removed from the outer end in turn. Typically, as the articles are removed, the distance between the outer end of the group of articles and the outer end of the rack increases, so the distance detector 110 can typically be used to detect the distance between the outer end of the group of articles and one end of the rack. In some cases, the rack has a mechanism that automatically pushes a group of articles towards the outer end of the rack. In these cases, the distance detector 110 can be used to detect the distance between the inner end of the group of articles and one end of the rack.

The controlling and processing unit 120 can be implemented by any processing unit that has logic operation, processing and controlling functions. The processing unit typically has a hardware processing circuit or chip and software for programming the hardware circuit or chip to cause the same to perform its functions. The software may be stored in a memory unit associated with the hardware processing circuit, be loaded in and executed by the hardware processing circuit, or be cured in the hardware processing circuit or chip. For example, the controlling and processing unit 120 may be implemented by a central processing unit (CPU), a microprocessor (MPU), a microcontroller (MCU), an application specific integrated circuit (ASIC), a system on chip (SOC), a field programmable gate array (PFGA), and the like.

The controlling and processing unit 120 can be communicatively connected to the distance detector 110, and thus can control the distance detector 110 to perform distance detection and receive the detected distance from the distance detector 110. The communication connection between the controlling and processing unit 120 and the distance detector 110 may be a wired connection or a wireless connection. Correspondingly, the controlling and processing unit 120 and the distance detector 110 may have a corresponding wired or wireless communication function (that may be implemented, for example, by a wired or wireless communication interface or unit), respectively.

The controlling and processing unit 120 may be mounted on the rack, as with the distance detector 110, or may be mounted outside the rack, for example, in a room in which the rack is located.

In some exemplary embodiments, the controlling and processing unit 120 is configured to compare the distance with a distance threshold and to determine whether the articles are out of stock based on the comparison result.

In some exemplary embodiments, the controlling and processing unit 120 is further configured to calculate the number of the group of articles on the rack based on the distance and a thickness of a single article in the arrangement direction (and/or the distance between two ends of the rack), and determine whether the articles are out of stock by comparing the calculated number with a number threshold. For example, in the embodiment where the distance detector 110 is used to detect the distance between the outer end of a group of articles and the outer end of a rack, and in the embodiment where the distance detector 110 is used to detect the inner end of a group of articles and the inner end of a rack, the controlling and processing unit 120 can be configured to subtract the detected distance from the distance between two ends of the rack (to obtain the length of the remaining articles of the group of articles on the rack), and divide the subtraction result by the thickness of a single article, so as to derive the number of the remaining articles on the rack. For another example, in the embodiment where the distance detector 110 is used to detect the distance between the outer end of a group of articles and the inner end of a rack, and in the embodiment where the distance detector 110 is used to detect the distance between the inner end of a group of articles and the outer end of a rack, the controlling and processing unit 120 can be configured to derive the number of the remaining articles by dividing the detected distance (i.e., the length of the remaining articles of the group of articles on the rack) by the thickness of a single article.

In some exemplary embodiments, the controlling and processing unit 120 is further configured to determine whether the distance has changed, calculate the number of the group of articles on the rack based on the distance if the distance has changed, or continue to control the distance detector 110 to detect the distance if the distance has not changed. That is, in such embodiments, after the controlling and processing unit 120 has obtained the distance between the end of the group of articles and the end of the rack utilizing the distance detector 110, the controlling and processing unit 120 first determines whether the distance has changed from the previously obtained distance (if it is the distance obtained for the first time, it is considered that it has changed), and then calculates the number of the group of articles based on the distance on the condition that the distance has changed.

In other exemplary embodiments, the controlling and processing unit 120 may not determine whether the distance has changed, but be configured to periodically calculate the number of the group of articles based on the distance.

It should be noted that, in some exemplary embodiments (e.g., embodiments where the distance detector 110 is an ultrasonic or infrared range finder, it includes a distance calculating module itself), the distance detector 110 can, under the control of the controlling and processing unit 120, directly measure the distance and transmit the distance to the controlling and processing unit 120. In other exemplary embodiments (e.g., embodiments where the distance detector 110 is an ultrasonic or infrared sensor, it does not include a distance calculating module itself), the distance detector 110, under the control of the controlling and processing unit 120, only transmits and receives ultrasonic waves or infrared rays, and transmits the transmitting time and the receiving time of the ultrasonic waves or infrared rays or the time difference therebetween to the controlling and processing unit 120, so that the controlling and processing unit 120 may calculate the distance based on the transmitting time and the receiving time or the time difference.

In some exemplary embodiments, the apparatus 100 further comprises a presenting unit 130 communicatively connected to the controlling and processing unit 120. The controlling and processing unit 130 is further configured to transmit the number of the group of articles to the presenting unit 120, and the presenting unit 120 is configured to present information about the inventory status of the articles. The information about the inventory status of the articles includes at least one of the number of the remaining articles, a status indicating whether or not the articles are out of stock, and stock-out warning information. By presenting the number of the remaining articles on the presenting unit 120, it is possible for the user to know the number of the remaining articles on the rack conveniently and in a timely manner, thereby enabling timely replenishment of the articles. In other exemplary embodiments, the apparatus 100 may not comprise the presenting unit 130.

In some exemplary embodiments, the controlling and processing unit 120 is further configured to transmit a signal to the presenting unit 130 if it is determined that the articles are out of stock, and the presenting unit 130 is configured to present stock-out warning information in response to receiving the signal. In some embodiments, the threshold may be pre-set by the user based on the actual consumption of the articles and stored in the controlling and processing unit 120. By presenting the stock-out warning information on the presenting unit 130, it is possible for the user to know the inventory status conveniently and in a timely manner, thereby enabling timely replenishment of the articles.

The communication connection between the presenting unit 130 and the controlling and processing unit 120 may be a wired connection or a wireless connection. The presenting unit 120 can be implemented by a display device such that the number of a group of articles can be presented in the form of an image. The presenting unit 120 can also be implemented by a voice outputting device such that the number of a group of articles can be presented in the form of a voice. The presenting unit 130 can also be implemented by a computer system comprising a voice outputting device and/or a display device.

In some exemplary embodiments, in addition to the presenting unit 130, the computer system may also comprise other related functional modules. For example, the computer system can also comprise a functional module and user interface for controlling and setting the controlling and processing unit 120. The computer system may be referred to as a background monitoring system and may also be included in the apparatus 100.

It should be noted that although only one distance detector 110, one controlling and processing unit 120 and one presenting unit 130 are shown in FIG. 1, the apparatus 100 may comprise any number of distance detector 110, any number of controlling and processing units 120, and any number of presenting units 130, in various exemplary embodiments. For example, in some embodiments, the apparatus 100 can comprise one distance detector 110 (or a row of distance detectors 110) on each tier of each rack in the warehouse; one controlling and processing unit 120 in the entire warehouse, or one controlling and processing unit 120 on each rack in the warehouse, or one controlling and processing unit 120 on each tier of each rack in the warehouse; and one presenting unit 130 in the entire warehouse, or one presenting unit 130 on each rack in the warehouse, or one presenting unit 130 on each tire of each rack in the warehouse.

The apparatus for detecting stock-out of articles on a rack according to embodiments of the present disclosure can automatically detect the number of the remaining articles, thereby enabling stock-out detection and early warning. Moreover, it is only needed to install the distance detector on the rack and add a controlling and processing unit communicatively connected thereto to implement the apparatus, which involves less modification to the rack. Therefore, it is a low-cost solution to implement the apparatus for detecting stock-out of articles on a rack according to embodiments of the present disclosure.

In some exemplary embodiments, the distance detector 110 may comprise a distance detection sensor that is mountable at one end of the rack (i.e., the second end), and that is configured to transmit a probe wave to the articles arranged on the rack, and to receive a reflected wave reflected by the articles. The controlling and processing unit 120 is further configured to control the distance sensor to transmit a probe wave and receive a reflected wave, and to calculate the distance according to a time difference between the transmitting time of the probe wave and the receiving time of the reflected wave. As such, according to the above description, the number of the group of articles can be effectively calculated. Moreover, such technical solution involves only minor modifications to the rack, and thus is a low-cost technical solution.

In some further embodiments, the distance detection sensor is an ultrasonic distance detection sensor or an infrared distance detection sensor.

Figure 2:
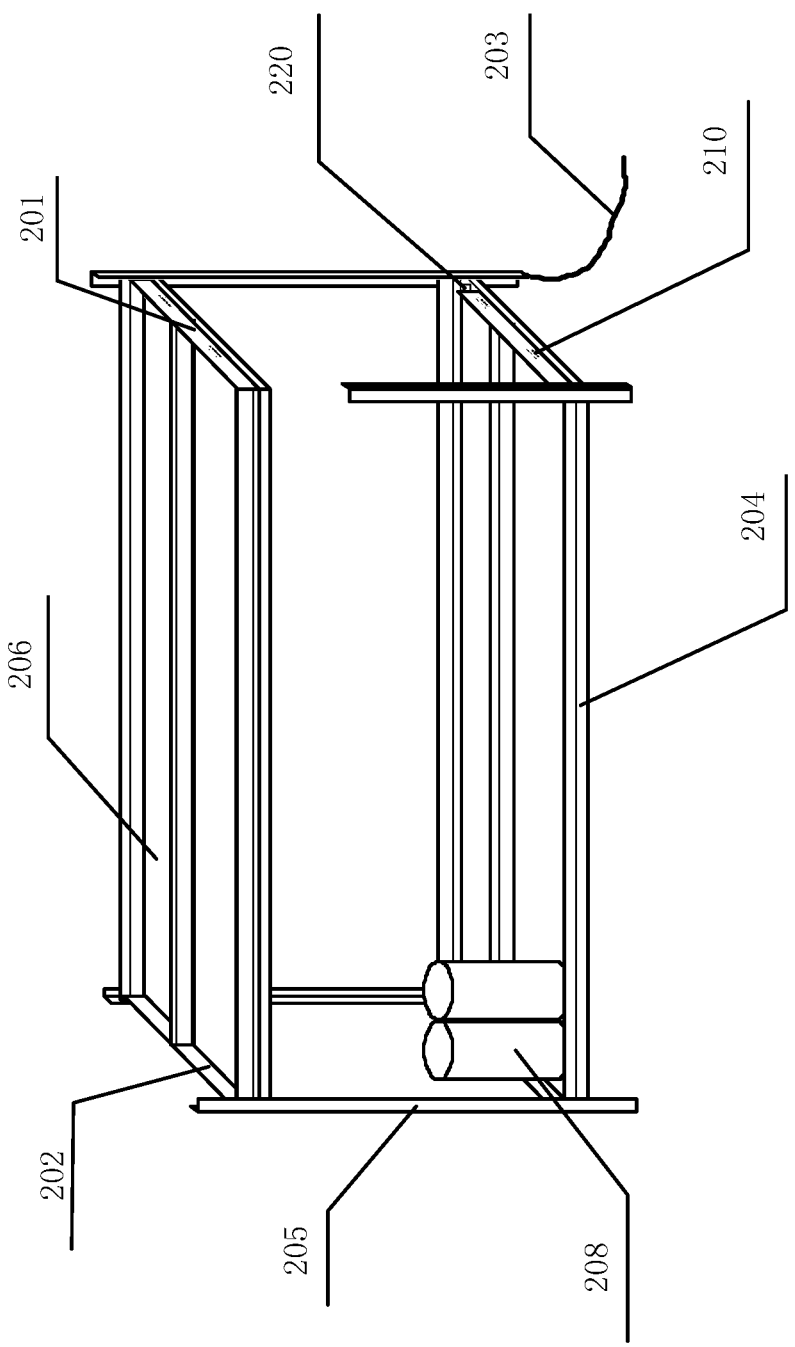
FIG. 2 is a schematic perspective view showing a state in which an apparatus for detecting stock-out of articles is mounted on a rack, according to some embodiments of the present disclosure.

Reference is now made to FIG. 2, which is a schematic perspective view showing a state in which an apparatus for detecting stock-out of articles on a rack is mounted on a rack, according to some embodiments of the present disclosure. In FIG. 2, articles are successively arranged on the rack starting from the inner end of the rack (provided with a rear baffle plate 202) towards the outer end of the rack (provided with a front baffle plate 201). That is, the inner end of the rack is a first end, and the outer end of the rack is a second end.

As shown in FIG. 2, the apparatus for detecting stock-out of articles on a rack may comprise a distance detection sensor 210 and a controlling and processing unit 220. The distance detection sensor 210 may be an ultrasonic distance detection sensor or an infrared distance detection sensor, and it may be mounted on the front baffle plate 201 of the rack to detect a distance between the articles and the front baffle plate 201 of the rack. Specifically, the distance detection sensor 210 can be mounted on a side of the front baffle plate 201 of the rack facing the articles.

It is illustrated in FIG. 2 that, on each tier of the rack, there are two distance detection sensors 210 being mounted on the front baffle 201 for measurement of two columns of articles on respective tier of the rack. Of course, in the case where one, three or more columns of articles can be arranged on each tier of the rack, there may be one, three or more distance detection sensors 210 being disposed on each tier of the rack. In other embodiments, the distance detection sensor 210 can also be mounted on the rear baffle plate 202 of the rack.

The controlling and processing unit 220 can be mounted on one side of the rack. There may be only one controlling and processing unit 220 being mounted on the entire rack for controlling all the distance detection sensors 210 mounted on the rack. Of course, it is also conceivable that there is one controlling and processing unit 220 being mounted on each tier of the rack for controlling the distance detection sensor 210 on the rack. Alternatively, it is conceivable that multiple racks share the same controlling and processing unit 220, which may be mounted on one of the racks or at other locations in the warehouse.

The controlling and processing unit 220 is configured to control the distance detection sensor 210 to transmit a probe wave and receive a reflected wave (for example, an ultrasonic wave or an infrared ray), to obtain a transmitting time and a receiving time, and to calculate a distance between the articles and the front baffle plate of the rack based thereon, thereby calculating the number of the articles. In some embodiments, the controlling and processing unit 220 may also issue a stock-out warning when the articles are out of stock. Also shown in FIG. 2 are a power line 203 via which power is supplied to the entire rack (e.g., the distance detection sensor 210 and the controlling and processing unit 220 thereon), partitions 204 for separating different articles, shelf holders 205 for supporting shelves of the rack, shelves 206 on which the articles rest, as well as the articles 207 on the rack, which are generally regular packaged articles. Of course, in other embodiments, the rack may also comprise other components and/or structures not shown in FIG. 2, and other components and/or structures that differ from those illustrated and described in FIG. 2.

Figure 3:
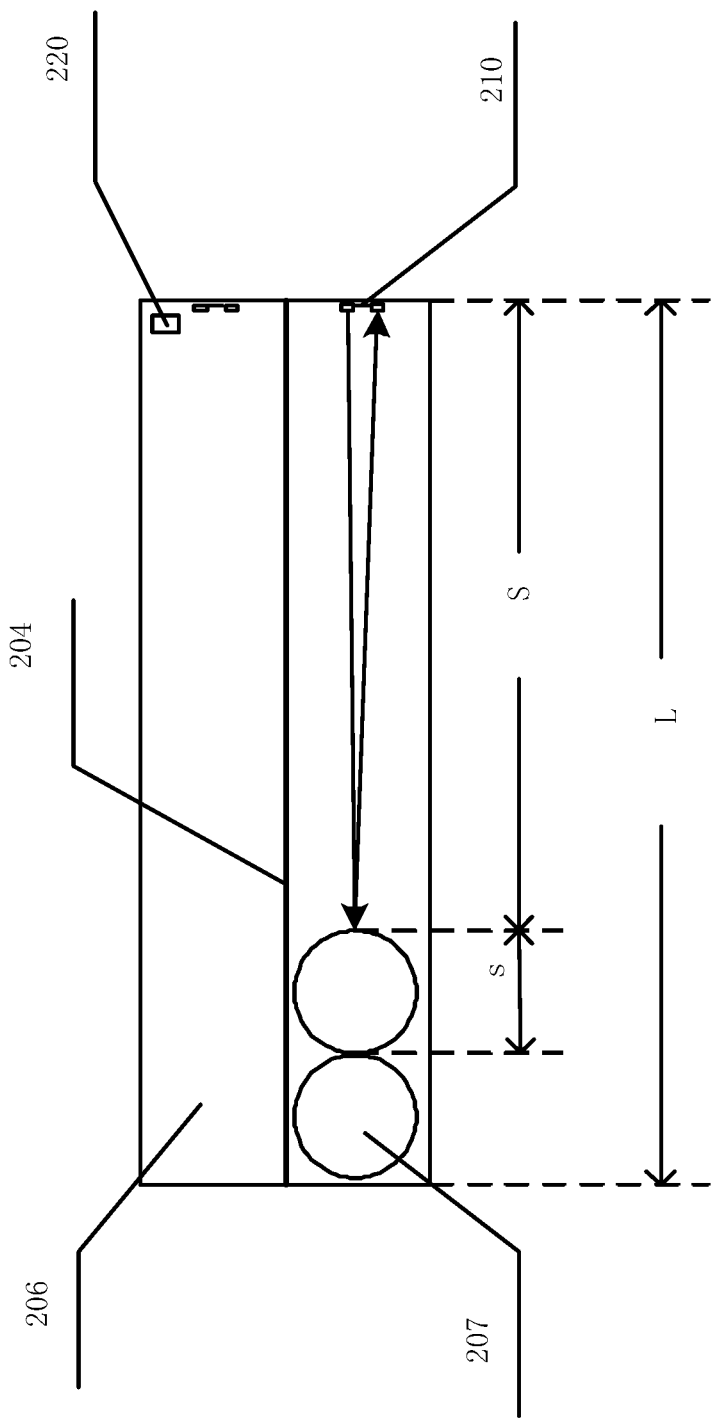
FIG. 3 is a schematic top view showing a state in which an apparatus for detecting stock-out of articles is mounted on a rack according to some embodiments of the present disclosure, and illustrates the detecting principle.

Reference is now made to FIG. 3, which is a schematic top view showing a state in which an apparatus for detecting stock-out of articles is mounted on a rack according to some embodiments of the present disclosure, and illustrates the detecting principle.

As shown in FIG. 3, taking an ultrasonic sensor as an example of a distance detection sensor 210, ultrasonic waves are emitted from a transmitting end of the ultrasonic sensor under the control of a controlling and processing unit 220.

The emitted ultrasonic waves are reflected by articles 207 on the rack when encountering the same, and the reflected ultrasonic waves are received by a receiving end of the ultrasonic sensor. Next, a time difference between the transmitting time and the receiving time of the ultrasonic wave is converted into a high-level time signal Δt, which is obtained by the controlling and processing unit 220, so as to calculate the distance S between the ultrasonic sensor and the articles 207 according to the formula $$2S = 340 \times \Delta t \quad (1)$$

where, 340 is the propagation velocity of ultrasonic waves, the unit for which is m/s.

Then, the controlling and processing unit 220 can determine whether the articles are out of stock based on the measured distance S. In one embodiment, the controlling and processing unit 220 may compare the distance S with a first threshold and determine that the articles are out of stock if S is greater than the first threshold. In another embodiment, the controlling and processing unit 220 may query for the length L of the rack and the thickness s of the article (where s refers to the size of a single article in the rack length direction), and calculate the number of the articles on the rack according to the following formula (2)

$$n = \frac{L-S}{s}. \quad (2)$$

The control processing unit 220 may then compare the calculated number n of the articles on the rack with a number threshold Nt. If n is less than the threshold Nt, it is determined that the articles are out of stock.

In addition, if it is determined that the articles are out of stock, the controlling and processing unit 220 may issue a stock-out warning to the presenting unit 130 or the background monitoring system. Alternatively, the controlling and processing unit 220 may directly transmit the calculated number n of the articles on the rack to the presenting unit 130 or the background monitoring system.

Figure 4:
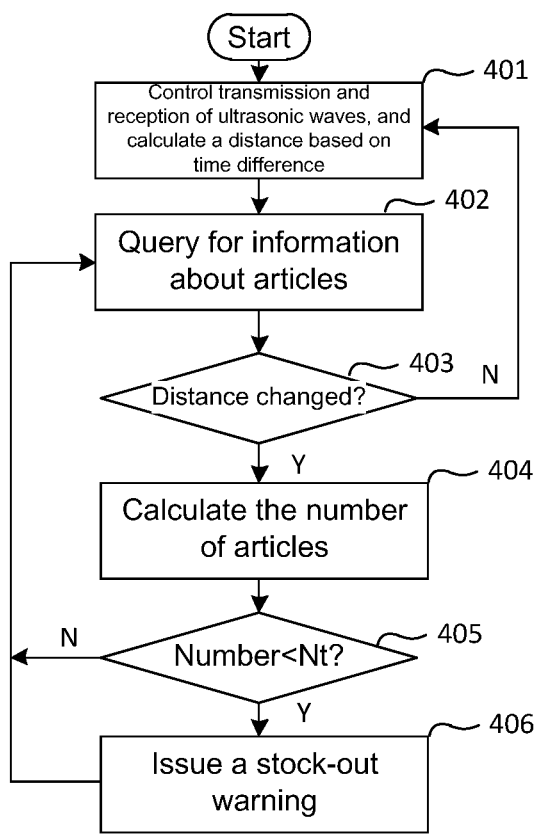
FIG. 4 illustrates an exemplary control and process flow of a controlling and processing unit, according to some embodiments of the present disclosure.

Reference is now made to FIG. 4, which illustrates an exemplary controlling and processing flow of a controlling and processing unit 220, according to some embodiments of the present disclosure. As shown in FIG. 4, the exemplary controlling and processing flow includes the following steps:

Step 401, the controlling and processing unit 220 controls an ultrasonic sensor to transmit and receive ultrasonic waves, and calculates the distance between the article farthest from a first end (i.e., the inner end of a rack) and a second end of the rack according to the transmitting time and the receiving time of the ultrasonic waves.

Step 402, information about the articles, including the name of the articles, the thickness of the article, the distance of the articles at the previous moment, and the like, is queried according to the serial number of the ultrasonic sensor.

Step 403, it is determined whether the distance of the articles has changed. If not, the process returns to the step 401; if yes, then the process proceeds to the step 404.

Step 404, the number n of the articles is calculated according to the distance of the articles calculated in the step 401 and the thickness of the article queried in the step 402.

Step 405, it is determined whether n is less than a given threshold Nt. If yes, the controlling and processing unit 220 issues a stock-out warning to the background monitoring system and can present the name of the articles being out of stock and the number of the articles on the rack.

Step 406, return to step 401 and repeat the above process.

It will be appreciated by those skilled in the art that the above steps are merely exemplary and do not limit the disclosure. In various embodiments of the present disclosure, the above described processes may include more, fewer, and different steps.

Figure 5:
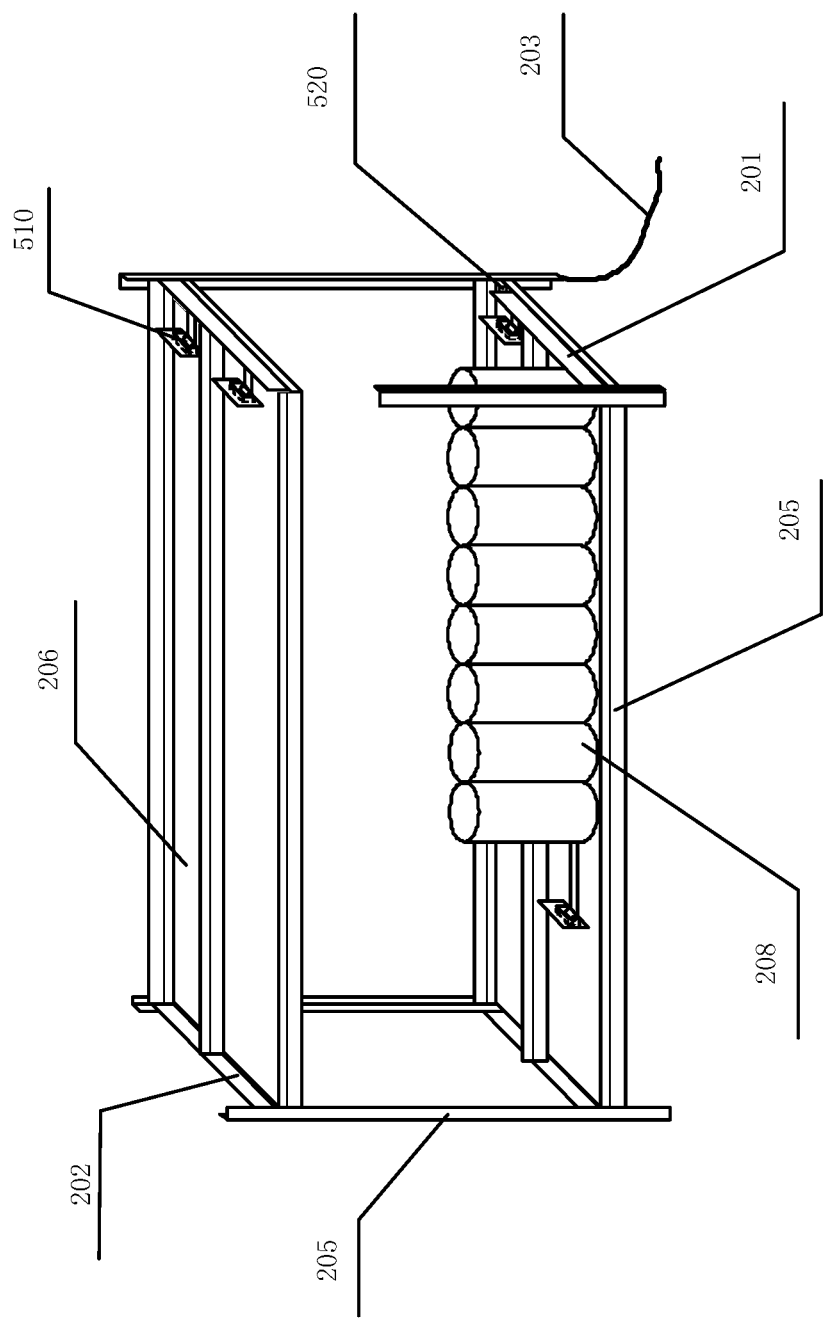
FIG. 5 is a schematic perspective view showing a state in which an apparatus for detecting stock-out of articles is mounted on a rack according to further embodiments of the present disclosure.
Figure 6:
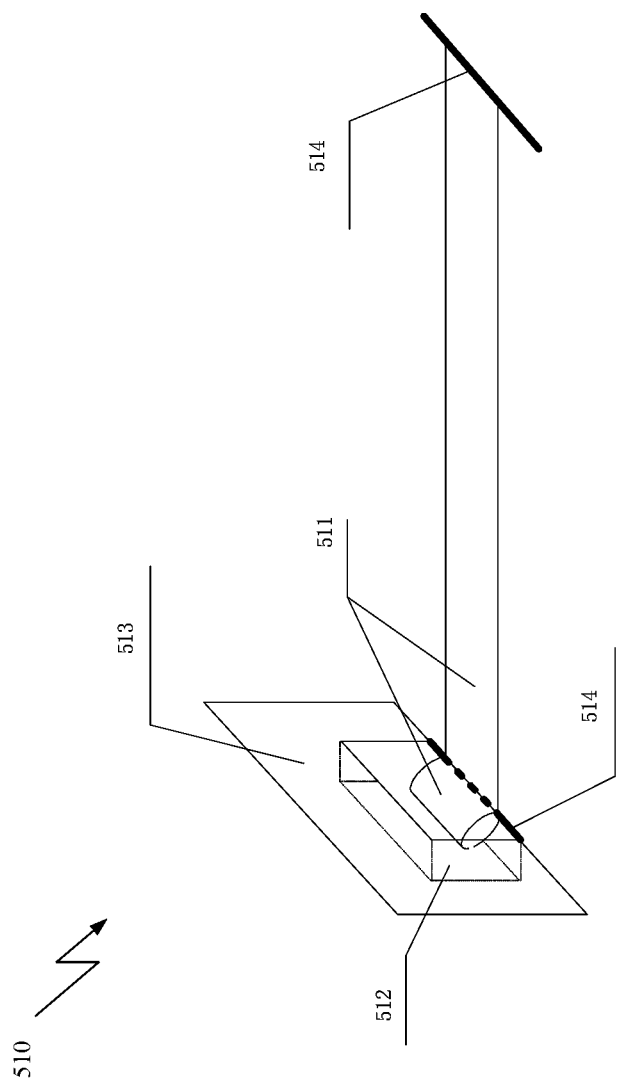
FIG. 6 illustrates a schematic structure diagram of a distance detector in an apparatus for detecting stock-out of articles according to further embodiments of the present disclosure.

Reference is now made to FIG. 5, which is a schematic perspective view showing a state in which an apparatus for detecting stock-out of articles on a rack is mounted on a rack, and to FIG. 6, which illustrates a schematic structure diagram of a distance detector in an apparatus for detecting stock-out of articles on a rack according to further embodiments of the present disclosure. In FIGS. 5 and 6, the articles are pushed towards the outer end of a rack by a winding mechanism. Thus, in those figures, the outer end of the rack corresponds to a first end and the inner end of the rack corresponds to a second end.

As shown in FIG. 5, the apparatus for detecting stock-out of articles on a rack may comprise a distance detector 510 and a controlling and processing unit 520. The distance detector 510 can be mounted on a shelf 206 on which the articles rest. The controlling and processing unit 520 can be mounted at a corner of the rack. It is illustrated in FIG. 5 that one distance detector 510 is mounted on each shelf 206 in each tier of the rack, and only one controlling and processing unit 520 is mounted on the entire rack. In other embodiments, a plurality of controlling and processing units 520 may be mounted on one rack, or a plurality of racks may share a single controlling and processing unit. Also shown in FIG. 5 are rear baffle plates 202 of the rack, a power line 203 via which power is supplied to the entire rack (e.g., the distance detector 510 and the controlling and processing unit 520 thereon), partitions 204 for separating different articles, shelf holders 205 for supporting each shelf of the rack, shelves 206, as well as the articles 207 on the rack, which are generally regular packaged articles. Of course, in other embodiments, the rack may also comprise other components and/or structures not shown in FIG. 5, and other components and/or structures that differ from those illustrated and described in FIG. 5.

As specifically shown in FIG. 6, the distance detector 510 is an L-shaped structure comprising an elastic tape 511, a housing 512, and two electrode sheets 514.

The elastic tape 511 includes a fixing end and a winding end. The fixing end is fixed to the outer end of the rack (i.e., the first end), and the winding end is retractable such that the elastic tape can extend and retract in a direction from the first end to the second end. The material of the elastic tape includes resistive material.

The housing 512 is configured to accommodate the winding end of the elastic tape 511 and is capable of moving with the winding end as the elastic tape 511 extends and retracts. The housing having an opening through which the elastic tape 511 passes to be wound up in the housing 512. The housing 512 may be a cuboid structure as shown in FIG. 6, or may be a hollow structure of other shapes. In some embodiments, a leaf spring mechanism for winding up the elastic tape 511 may be provided in the housing 512.

The winding up may be, for example, winding up around the body of the elastic tape or winding up around a shaft fixed to an end of the elastic tape. The elastic tape 511 may be wound up in the natural state, and it may extend by means of an appropriate external force. As such, it can automatically wind up by means of its own elastic force, thereby automatically shrinking the length and driving the housing 512 to move as the articles are removed from the rack. Thus, the elastic tape 511 may operate to automatically arrange the articles. Alternatively, similar to a steel tape measure, the elastic tape 511 may be straightened in the natural state and be wound up within the housing 512 via a leaf spring mechanism disposed within the housing 512, and it can be pulled out of the housing 512 and expand.

The elastic tape 511 may be made of any material suitable for performing resistance measurement, such as a metal, an alloy, a carbon-based material, a composite material or a structure, etc., which may be resistance material, for example. Also, the elastic tape 511 may be consisted of a base of other materials and a material layer, that is located on or in the base and extends in the length direction, and that is formed from any material suitable for resistance measurement. In some embodiments, in the case where the elastic tape 511 includes a conductor such as a metal or an alloy, the surface of the elastic tape 511 may be coated with insulating material, so that when a group of articles are arranged on the extended part of the elastic tape 511, it is possible to avoid electrical contact with articles having metal packaging.

One side of the housing 512 abuts against the inner end of the articles (i.e., the end of the article farthest from the first end). As the articles are removed from the rack, the length of the group of articles is decreased, and the elastic tape 511 is also shortened under the elasticity force, thereby driving the housing 512 to move. As such, the side of the housing 512 always abuts against the inner end of the articles.

In some exemplary embodiments, as shown in FIG. 6, a baffle plate 513 is disposed on a side of the housing 512 (i.e., the side abutting against the articles) to facilitate abutting against an inner end of the articles. All the baffle plates 513 can be a flat plate of rigid material and have a size larger than that of the sides of the housing, so that it can better abut against the articles, and thus better arrange the articles automatically. Of course, the baffle plate 513 can also be a part of the housing 512.

The two electrode sheets 514 are electrically connected to a fixing end of the elastic tape and a portion of the elastic tape located at the opening of the housing, respectively. And each of the two electrode sheets 514 is electrically connected to the controlling and processing unit 520 (for example, an input terminal of the controlling and processing unit 520) for measuring the electrical resistance between the fixing end of the elastic tape and the portion of the elastic tape located at the opening of the housing. The two electrode sheets 514 may be metal detecting electrodes.

The controlling and processing unit 520 can be configured to calculate a distance between the article farthest from the first end and the first end based on the resistance.

Specifically, the resistance between both ends of the elastic tape 511 satisfies the following formula:

$$R_L = \rho \cdot \frac{L}{A}. \quad (3)$$

where, $R_L$ is the resistance between both ends of the elastic tape 511 (or the material layer thereof being suitable for resistance measurement) (i.e., the resistance between the both ends, with the current length in-between being L), and p is the resistivity of the elastic tape 511 (or the material layer thereof being suitable for resistance measurement), and A is the cross-sectional area of the elastic tape 511 (or the material layer thereof being suitable for resistance measurement). That is, the resistance between the pair of electrode sheets 514 is proportional to the distance L therebetween. Therefore, the controlling and processing unit 520 can calculate the length L of the articles on the rack by measuring the resistance between the pair of electrode sheets 514.

In some embodiments, the controlling and processing unit 520 can directly compare the calculated length L with a second distance threshold, and determine that the articles are out of stock if the length L is less than the second distance threshold. In other embodiments, the controlling and processing unit 520 can divide length L by the thickness s of a single article to calculate the number of the articles on the rack. The controlling and processing unit 520 compares the calculated number of the articles with a number threshold Nt. If the number is less than the threshold Nt, it is determined that the articles are out of stock.

The controlling and processing unit 520 may be electrically connected to the two electrode sheets 514 via wires, and may comprise a resistance measuring circuit or interface for measuring the resistance of the elastic tape (or the material layer thereof being suitable for resistance measurement) between the two electrode sheets 514.

The controlling and processing unit 520 can be implemented by any processing unit that has logic operation, processing and controlling functions. The processing unit typically has a hardware processing circuit or chip and software for programming the hardware circuit or chip to cause the same to perform its functions. The software may be stored in a memory unit associated with the hardware processing circuit, be loaded in and executed by the hardware processing circuit, or be cured in the hardware processing circuit or chip. For example, the controlling and processing unit 120 may be implemented by a central processing unit (CPU), a microprocessor (MPU), a microcontroller (MCU), an application specific integrated circuit (ASIC), a system on chip (SOC), a field programmable gate array (PFGA), and the like.

The apparatus for detecting stock-out of articles on a rack according to embodiments of the present disclosure has been described above with reference to the accompanying drawings, however, it should be noted that the above description is only an example, but not a limitation of the present disclosure. In other embodiments of the present disclosure, the apparatus for detecting stock-out of articles on a rack may comprise more, fewer, and different components and structures.

Figure 7:
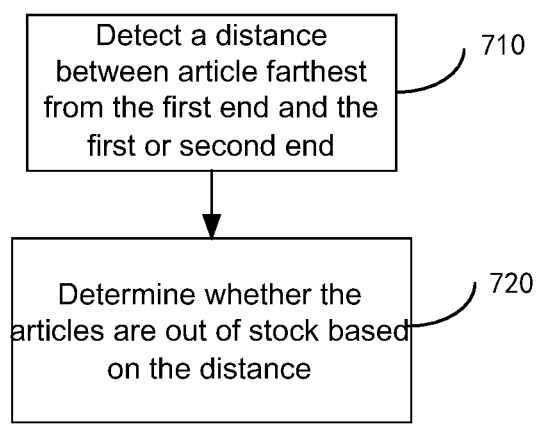
FIG. 7 illustrates a flow chart of a method for detecting stock-out of articles according to embodiments of the present disclosure.

As will be apparent to those skilled in the art from the above description, in another aspect of the present disclosure, there is also proposed a method for detecting stock-out of articles on a rack, as shown in FIG. 7. The method can be implemented by the apparatus for detecting stock-out of articles on a rack described above with reference to FIGS. 1-6, and thus the above explanations and illustrations for different embodiments are applicable here. As described above, the rack comprises a first end and a second end opposite to each other and is capable of accommodating articles arranged in the direction from the first end towards the second end. The method can comprise the following steps:

Step 710: detect a distance between the article farthest from a first end and one of the first end and a second end; and Step 720: determine whether the articles are out of stock based on the distance.

In some exemplary embodiments, the step of determining whether the articles are out of stock based on the distance comprises:

comparing the distance to a distance threshold, and determining whether the articles are out of stock based on the comparison result.

In some exemplary embodiments, the step of determining whether the articles are out of stock based on the distance comprises:

determining the number of remaining articles based on the distance and at least one of the distance between the first end and the second end or a thickness of a single article in the arrangement direction;

comparing the number of the remaining articles to a threshold number; and determining that the articles are out of stock if the number of the remaining articles is less than the number threshold.

Specifically, in the embodiment shown in FIGS. 2-3, the number of the remaining articles of the articles is determined based on the distance and the thickness of a single article in the arrangement direction. In the embodiment shown in FIGS. 5-6, the number of the remaining articles of the articles is determined based on the distance, a distance between the first end and the second end, and the thickness of a single article in the arrangement direction.

In some exemplary embodiments, the method for detecting stock-out of articles on a rack further comprises the following steps:

determine whether the distance has changed;

determine whether the articles are out of stock on the condition that the distance has changed.

In some exemplary embodiments, the method for detecting stock-out of articles on a rack further comprises the following step:

present the number of the group of articles.

In some exemplary embodiments, the method for detecting stock-out of articles on a rack further comprises the following step:

present stock-out warning information if it is determined that the articles are out of stock.

The method for detecting stock-out of articles on a rack according to embodiments of the present disclosure has been described above, however, it should be noted that the above description is only an example, but not a limitation of the present disclosure. In other embodiments of the present disclosure, the method for detecting stock-out of articles on a rack may comprise more, fewer, and different steps, and the order, inclusion relationship, functional relationship, and the like between the steps may be different from those described.

As is apparent to those skilled in the art from the above description, in yet another aspect of the present disclosure, there is also proposed a rack comprising an apparatus for detecting stock-out of articles on a rack according to any one of the embodiments of the present disclosure.

For the purposes of illustration and explanation, there is provided the foregoing description of the embodiments of the present disclosure, in which numerous specific details are set forth, such as examples of specific components and apparatuses, in order to provide a thorough understanding of the embodiments of the present disclosure but not to be exhaustive or to limit the disclosure. The various elements or features of a particular embodiment are generally not limited to that particular embodiment, but are interchangeable and may be used in other embodiments where applicable, even if they are not specifically illustrated or described. Such variations should not be regarded as departing from the disclosure, and all such modifications are intended to be included within the scope of the disclosure. In some example embodiments, well-known components, structures, and well-known techniques are not described in detail.

The terms used herein are merely for the purpose of describing particular example embodiments but not limiting the disclosure. The names of the components in the present application are defined merely for convenience of description, but are not intended to limit the present disclosure. As used herein, singular forms "a", "an" and "the" are also intended to include the plural unless the context clearly indicates otherwise. Terms "include", "comprise", "contain" and "have" are inclusive, and indicate the existence of the features, entities, steps, operations, elements, components, but not exclude the addition of one or more other features, entities, steps, operations, elements, components and/or combinations thereof. The steps, processes, and operations described herein are not to be construed as necessarily requiring that they be performed in the specific order as discussed or illustrated, unless the order of execution is explicitly specified.

When an element is referred to as being "on," "attached to," "connected to," or "coupled to" another element, it can be directly on, attached to, connected to or coupled to the other element, or an intermediate element can be interposed therebetween. Other terms used to describe the relationship between the elements should be interpreted in a similar manner (for example, "between" and "directly between", "adjacent" and "directly adjacent", etc.). As used herein, "connected to," "connected with" or similar terms may refer to any one or more of mechanical, electrical, and communication connections if not otherwise specifically defined. Also, as used herein, the term "and/or" include any and all combinations of one or more of the associated listed items.

Although terms "first", "second", "third", etc. may be used herein to describe various elements, components and/or portions, these elements, components and/or portions should not be limited by these terms. These terms are merely used to distinguish one element, component, or part from another element, component, or part. Terms such as "first," "second," and other numerical terms used herein do not imply the order or sequence, unless the context clearly indicates otherwise. Thus, a first element, component or portion in the application may be referred to as a second element, component or portion, without departing from the teachings of the example embodiments.

For the convenience of description, spatial and spatially relative terms, such as "internal," "external," "below," "under," "above," "over," etc., may be used herein to describe the relationship between one element or feature and another element or feature as shown in the figures. Spatially relative terms may be intended to encompass different orientations of the apparatus in use or operation, in addition to the orientation shown in the figures. For example, elements that are described as "below" or "beneath" other elements or features will be oriented "above" other components or features. Thus, exemplary term "below" can encompass orientations including above and below. The apparatus may be otherwise oriented (rotated 90 degrees or in other directions), and accordingly the spatial descriptions used herein should be interpreted relatively.

It is to be understood that the above-described embodiments of the present disclosure are merely exemplary embodiments employed to explain the principles of the present disclosure, and the present disclosure is not limited thereto. Various modifications and improvements can be made by those skilled in the art without departing from the spirit and scope of the disclosure, and such modifications and improvements are also considered to be within the scope of the present disclosure. The scope of the present disclosure is defined only by the appended claims and their equivalents.

We claim:

1. An apparatus for detecting stock-out of articles on a rack, the rack comprising a first end and a second end opposite to each other and being capable of accommodating the articles arranged from the first end towards the second end, the apparatus comprising:
   a distance detector, configured to detect a distance between an article farthest from the first end and one of the first end and the second end; and
   a controlling and processing unit, communicatively connected to the distance detector and configured to determine whether the articles are out of stock based on the distance;
   wherein the distance detector comprises:
      an elastic tape having a fixing end fixed to the first end and a winding end being retractable such that the elastic tape may extend and retract in the direction from the first end to the second end, wherein the material of the elastic tape comprises resistive material;
      a housing, configured to accommodate the winding end of the elastic tape and being capable of moving with the winding end as the elastic tape extends and retracts, wherein the housing has an opening through which the elastic tape passes to be wound up in the housing; and
      two electrode sheets, one of which being configured to be electrically connected to the fixing end of the elastic tape and the other being configured to be electrically connected to a portion of the elastic tape at the opening of the housing, the two electrode sheets being configured to measure resistance between the fixing end of the elastic tape and the portion of the elastic tape at the opening of the housing;
   wherein the controlling and processing unit is further configured to calculate the distance between the article farthest from the first end and the first end based on the resistance.

2. The apparatus of claim 1, wherein the distance is between the article farthest from the first end and the second end, and the distance detector comprises:
   a distance detection sensor, capable of being mounted at the second end of the rack and transmitting a probe wave to the articles at the second end and receiving a reflected wave of the probe wave;
   wherein the controlling and processing unit is further configured to calculate the distance between the article farthest from the first end and the second end based on a time difference between a transmitting time of the probe wave and a receiving time of the reflected wave.

3. The apparatus of claim 2, wherein the probe wave is an ultrasonic wave or an infrared ray.

4. The apparatus of claim 2, wherein the controlling and processing unit is configured to:
   compare the distance with a first distance threshold, and determine that the articles are out of stock if the distance is greater than the first distance threshold.

5. The apparatus of claim 2, wherein the controlling and processing unit is configured to:
   determine a number of remaining articles based on the distance between the article farthest from the first end and the second end, a distance from the first end to the second end, and a thickness of a single article in the arrangement direction;
   compare the number of the remaining articles to a number threshold; and
   determine that the articles are out of stock if the number of the remaining articles is less than the number threshold.

6. The apparatus of claim 2, wherein the controlling and processing unit is further configured to:
   determine whether the distance between the article farthest from the first end and the second end has increased, and
   determine whether the articles are out of stock, only on the condition that the distance between the article farthest from the first end and the second end has increased.

7. The apparatus of claim 1, wherein the controlling and processing unit is configured to compare the distance with a second distance threshold, and determine that the articles are out of stock if the distance is less than the second distance threshold.

8. The apparatus of claim 1, wherein the controlling and processing unit is configured to:
   determine a number of remaining articles based on the distance and a thickness of a single article in the arrangement direction;
   compare the number of the remaining articles to a number threshold; and
   determine that the articles are out of stock if the number of the remaining articles is less than the number threshold.

9. The apparatus of claim 1, wherein the controlling and processing unit is further configured to:
   determine whether the distance has decreased, and
   determine whether the articles are out of stock only on the condition that the distance has decreased.

10. The apparatus of claim 1, further comprising a presenting unit communicatively connected to the controlling and processing unit, wherein
   the presenting unit is configured to present information about the inventory status of the articles.

11. The apparatus of claim 10, wherein the information about the inventory status of the articles comprises at least one of the number of the remaining articles, a status indicating whether or not the articles are out of stock, and stock-out warning information.

12. A method for detecting stock-out of articles on a rack by using the apparatus of claim 1, the rack comprising a first end and a second end opposite to each other and being capable of accommodating the articles arranged from the first end towards the second end, the method comprising steps of:
   detecting a distance between an article farthest from the first end and one of the first end and the second end; and
   determining whether the articles are out of stock based on the distance.

13. The method of claim 12, wherein the step of determining whether the articles are out of stock based on the distance comprises:
   comparing the distance to a distance threshold, and
   determining whether the articles are out of stock based on the comparison result.

14. The method of claim 12, wherein the step of determining whether the articles are out of stock based on the distance comprises:
   determining the number of the remaining articles based on the distance and at least one of a distance from the first end to the second end or a thickness of a single article in the arrangement direction;

comparing the number of the remaining articles to a number threshold; and determining that the articles are out of stock if the number of the remaining articles is less than the number threshold.

15. The method of claim 12, further comprising:

determining whether the distance has changed;

determining whether the articles are out of stock on the condition that the distance has changed.

16. The method of claim 12, further comprising:

presenting stock-out warning information if it is determined that the articles are out of stock.

17. A rack comprising the apparatus of claim 1.

* * * * *